Oct. 21, 1941.  S. O. HARLAN  2,259,816
TRUCK
Filed Nov. 5, 1938  4 Sheets-Sheet 3

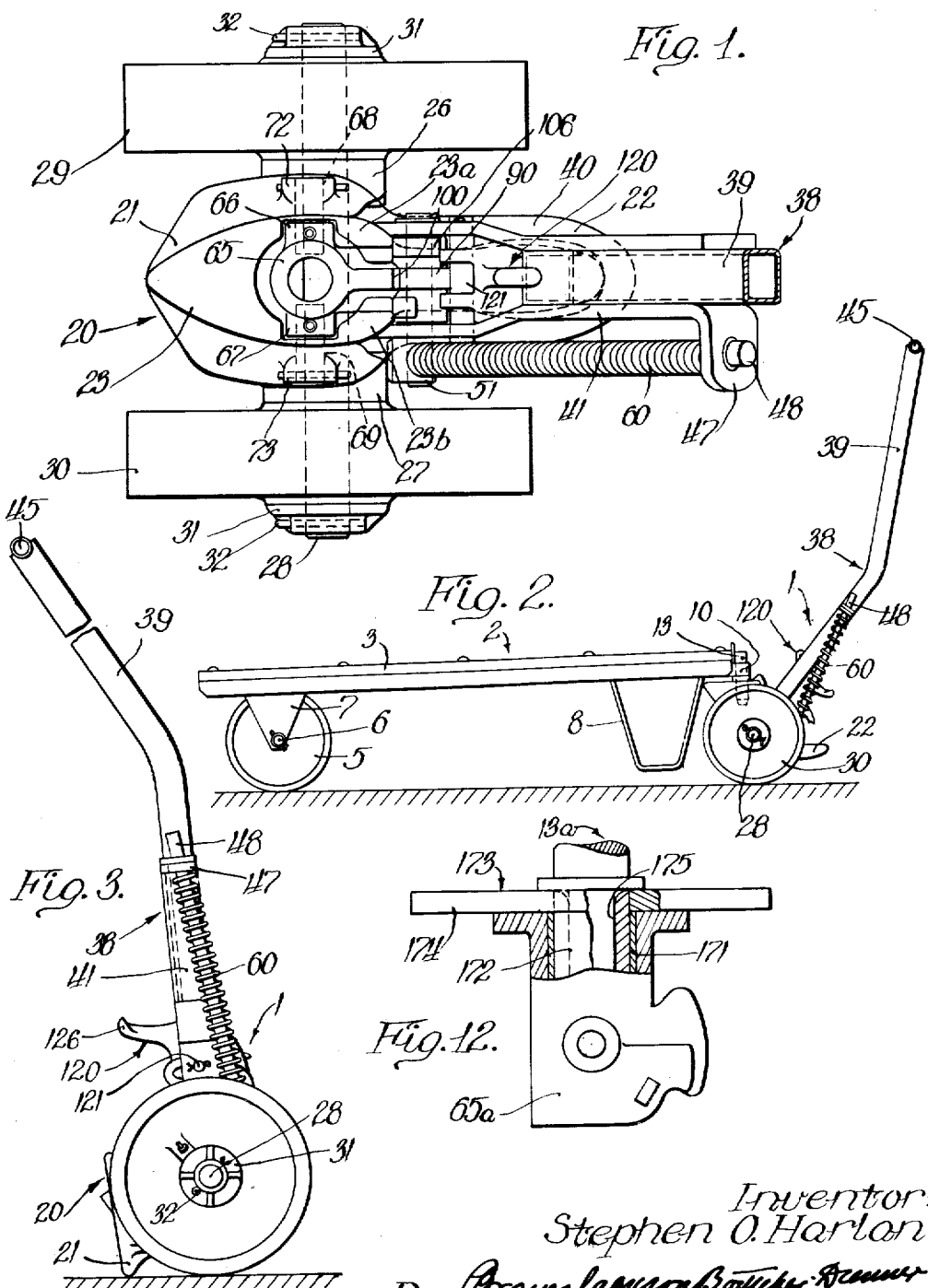

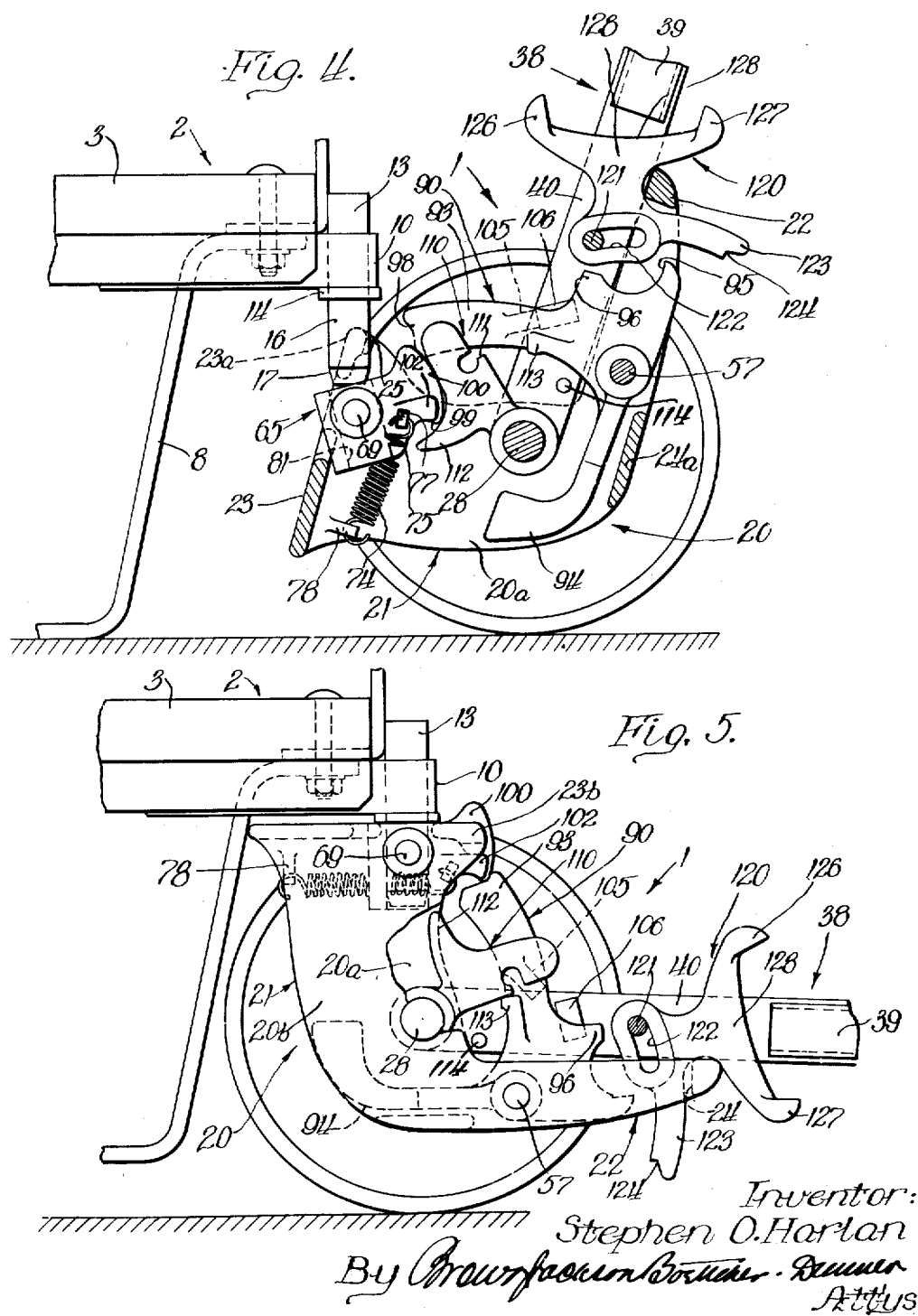

Inventor:
Stephen O. Harlan
By
Att'ys.

Oct. 21, 1941.    S. O. HARLAN    2,259,816
TRUCK
Filed Nov. 5, 1938    4 Sheets-Sheet 4
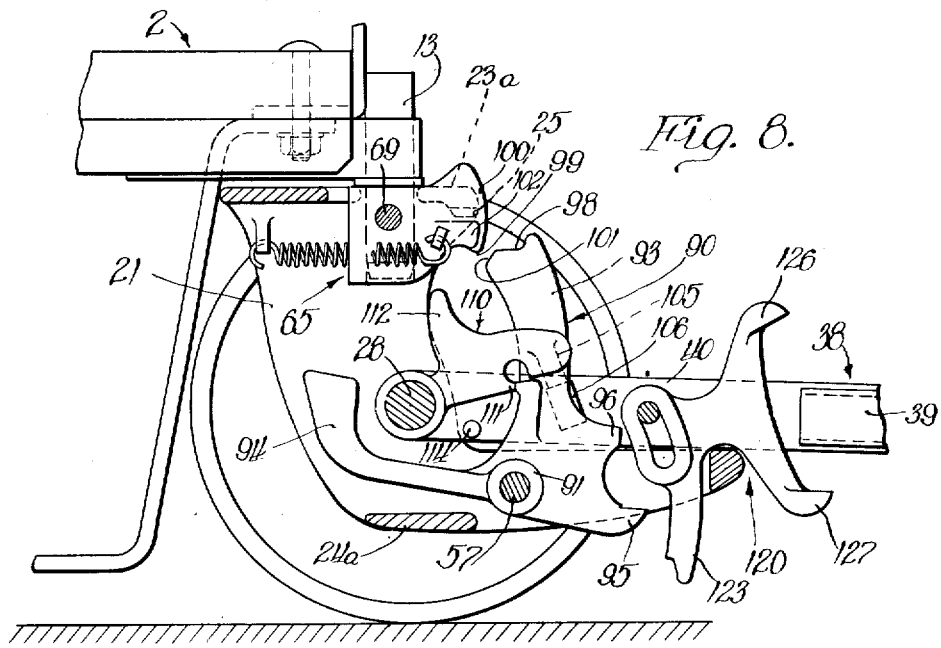
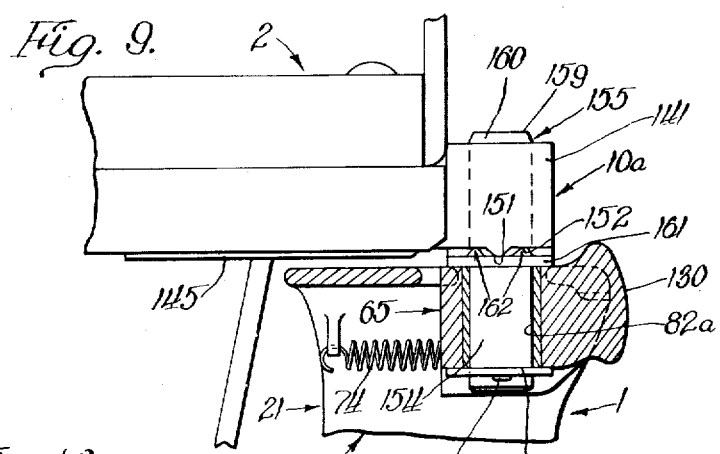
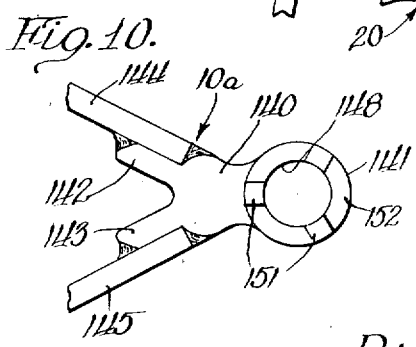
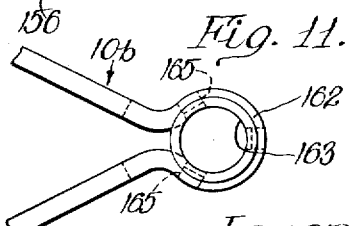
Inventor:
Stephen O. Harlan Patented Oct. 21, 1941

2,259,816

UNITED STATES PATENT OFFICE 2,259,816

TRUCK

Stephen O. Harlan, Elmhurst, Ill., assignor to Barrett-Cravens Company, Chicago, Ill., a corporation of Illinois Application November 5, 1938, Serial No. 238,963

29 Claims. (Cl. 280—46)

This invention relates generally to industrial trucks and the like and particularly to that class of trucks which are adapted to be used with a removable platform which has wheels at one end and legs at the other, the truck being in the form of a wheeled jack which is particularly arranged to engage the leg-supported end of the platform to raise the same off the floor for the purpose of moving the platform and the load carried thereby from place to place, as desired.

The object and general nature of my invention is the provision of an improved truck of the wheeled jack type having an eccentrically pivoted platform engaging and lifting element and improved latch mechanism for locking the frame of the truck to the element when the latter is secured to the platform. More particularly, one feature of my invention is the provision of controlling means for the latch mechanism which is actuated entirely by movements of the handle relative to the truck frame, thereby eliminating triggers, springs, levers, and other parts mounted on the handle and requiring separate actuation by the operator. Another feature of this invention is the provision of an improved frame construction by which movement of the truck into position to engage a platform is facilitated by guiding means which is effective by the movement of the truck in the same direction that the truck is moved when engaging and raising the platform.

Another important feature of this invention is the provision of improved platform and truck construction which embodies a connecting stud carried by the engaging and raising element of the truck, a bracket carried by the platform and adapted to receive the stud, and means acting between the platform and the stud for locking the latter against rotation relative thereto when it is engaged by the platform, thereby assuring that all relative rotation between the platform and truck takes place between the pivoted platform engaging and raising element thereon and the stud.

Still further, another important feature of my invention is the provision of means including a locking latch for locking the frame of the truck to the platform engaging and raising element so that swinging movement between the frame and said element in either direction is prevented; and an additional feature of this invention is the provision of means actuated by the movement of said element relative to said frame for releasing the locking latch after the platform has been lowered to the floor and permitting its movement into a position ready to lock the frame and element together when a platform is subsequently engaged and raised.

These and other objects and advantages of my invention will be apparent to those skilled in the art after a consideration of the following detailed description of the preferred embodiment, taken in conjunction with the accompanying drawings.

In the drawings:

Figure 1 is a plan view of a truck of the wheeled jack type in which the principles of the present invention have been embodied;

Figure 2 is a view of the truck in use, supporting one end of a platform with the legs or other supporting means out of contact with the floor so as to permit moving the platform, with any load thereon, from place to place;

Figure 3 is a side view of the truck in the position in which it may be placed for storage or at other times when the truck is not in use;

Figure 4 is an enlarged side view showing the manner of engaging the truck with a platform to raise the same and the position of the parts when the truck is first brought into position to engage the platform;

Figure 5 is a view similar to Figure 4, showing the relative positions of the platform and truck parts after the handle of the truck has been swung downwardly to engage and raise the platform into load transporting position;

Figure 8 is a view similar to Figure 7, showing the locking latch released and the positions of the parts when the operator is ready to lower the platform;

Figure 9 is an enlarged fragmentary view showing a modified form of connecting stud associated with the platform and the truck;

Figure 10 is a fragmentary view showing the forward end of the bracket which is attached to the platform in the relation shown in Figure 9;

Figure 11 is a modified form of bracket; and

Figure 12 illustrates a modified form of construction in which the platform engaging and raising member is provided with a turntable adapted to receive a fixed stud on the platform.

Figure 6:
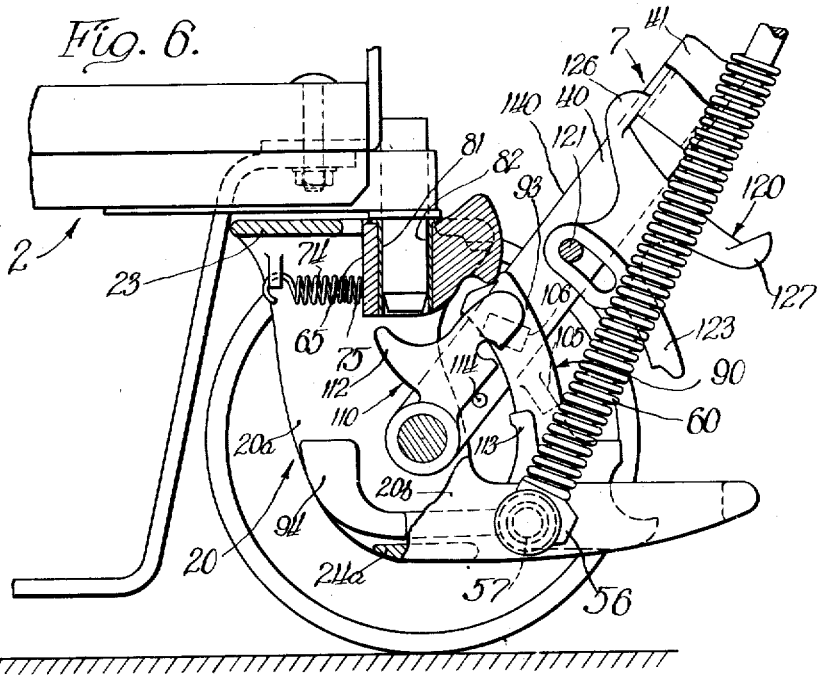
Figure 6 is a view similar to Figure 5, but showing certain parts in section in order to illustrate the details thereof and also illustrating the freedom of movement of the handle when pulling the complete unit from place to place.

Referring first to Figure 2, the truck constructed according to the principles of the present invention is indicated in its entirety by the reference numeral 1 and the reference numeral 2 indicates one of the platforms with which the truck 1 is particularly adapted to operate. The platform 2 consists of a floor 3 formed in any suitable manner, such as interconnected angle irons and planking or the like, rear supporting wheels 5 journaled on an axle 6 supported in brackets 7 secured to the floor 3, and a front leg or legs 8 of any suitable construction. As best shown in Figure 4, the front end of the platform 2 is provided with truck receiving section that includes a bracket 10, preferably formed of strap iron or the like and secured in any suitable manner to the under side of the platform 2, and a stud 15 or pin 13 which the front end of the bracket 10 is formed to receive. The stud or pin 13 (Figure 4) is provided with a flange 14 and a lower section 16, the lower end of which is tapered, as indicated at 17. The pin or stud 13 is welded or otherwise permanently secured to the bracket 10 so as to form a fixed and permanent part of the platform. The flange or shoulder 14 bears against the lower portion of the bracket 10 and, in turn, receives the upper surface of a platform engaging and lifting member which forms a part of the truck, which will now be described.

Figure 7:
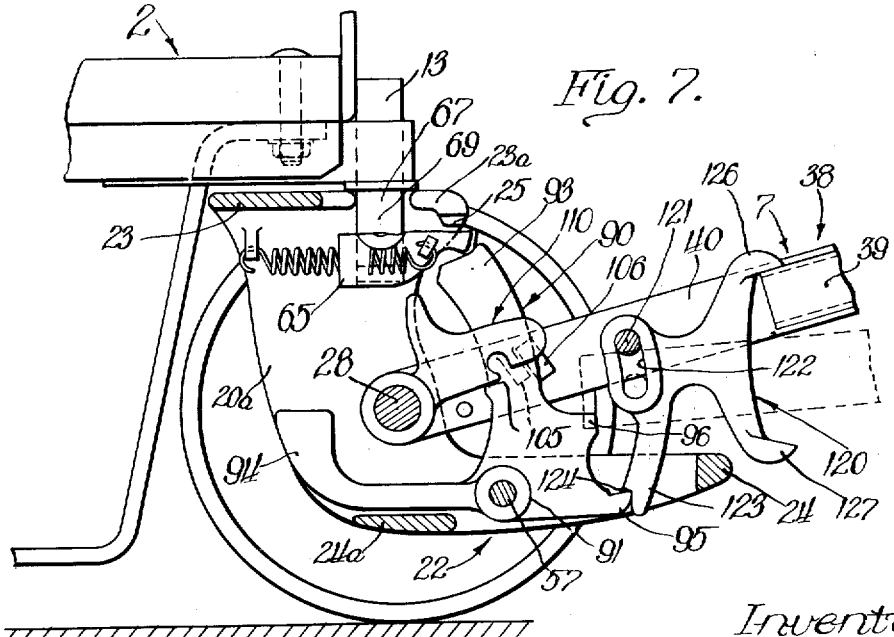
Figure 7 illustrates the position of the handle when bringing the mechanism into position to release the locking latch preparatory to lowering the platform.

The truck 1 consists of a frame 20 which is preferably, but not necessarily, in the form of a malleable iron casting. In general, the frame consists of two spaced-apart side sections, indicated at 20a and 20b, the frame being of generally L-shaped configuration when viewed laterally and includes a normally vertical section 21 and a horizontal forwardly extending portion 22. The sides 20a and 20b are joined together at 23 at the upper end of the generally vertical portion 21, and also at the forward end of the horizontal portion 21 as indicated at 24 (Figures 5 and 7). A web 24a connects the sides 20a and 20b intermediate their ends. The section 21 is of generally U-shaped configuration when viewed from above, forming arms 23a and 23b as shown in Figure 1, the upper part of the portion 23 being flattened, as best shown in Figure 4. The ends of the arms 23a and 23b (Figure 1) of the U-shaped upper section 23 face forwardly and are spaced apart to receive the pin 16 therebetween, as best shown in Figure 4. Lugs 25 (Figure 7) are formed on the under side of the arms 23a and 23b to form abutment stops for the lugs 102 on the socket member 65, as will be later described. The side sections 20a and 20b adjacent the juncture of the vertical and horizontal portions 21 and 22 are provided with bosses 26 and 27 (Figure 1) which are apertured to receive an axle 28 upon which relatively closely spaced supporting wheels 29 and 30 are journaled for rotation. Collars 31 are carried by cotter pins 32 for holding the wheels on the axle.

A handle member, indicated in its entirety by the reference numeral 38, is pivoted to the frame for relative swinging movement about the axis of the axle 28 and consists of a tube 39, substantially square in cross section as shown in Figure 1, to which a pair of strap members 40 and 41 are secured in any suitable manner, as by welding or the like. The lower ends of the members 40 and 41 are apertured to receive the axle 28, as best indicated in Figure 4, and the upper end of the tube 39 has a hand grip 45 secured thereto, as by welding or the like. The upper end of the strap member 41 is bent outwardly, as at 47 (Figure 1), and is apertured to receive the upper end of a guide pin 48, the lower end of which is received in a socket member 56 (Figure 6) carried at one end of a pivot shaft 57. This pivot shaft 57 is mounted in the lower forwardly extending portion 22 of the truck frame, extending between and through the side frame portions 20a, 20b. A spring 60 surrounds the rod 48 and exerts a continuous bias against the bracket 56 and the end 47 for holding the handle in a generally upright position relative to the truck frame 20.

A platform engaging and raising socket or sleeve member 65 is provided with bosses 66 and 67 (Figure 1) which are apertured and receive trunnion pins 68 and 69 by which the member 65 is pivotally supported in eccentric relation with respect to the axle 28 for movement about an axis parallel to the axis of the axle 28. The upper part of the portion 21 of the truck frame is provided with bosses 72 and 73 which are bored to receive the trunnion pins 68 and 69, as best indicated in Figure 1, the socket member 65 being biased for movement into the position shown in Figure 4 relative to the frame 20 by means of a pair of biasing springs 74 and 75, the inner ends of which hook into lugs 77 (Figure 4) formed on opposite sides of the socket member 65 and the outer ends being hooked into similar lugs 78 formed on the frame 20 adjacent the upper end of the vertical portion 21 thereof. The socket member 65 is provided with a vertical bore 81 (Figure 6) therein, and the bore is lined with a hardened bushing 82 so as to reduce wear between the socket 65 and the platform stud 16 which is received within the bore 81 when the truck is used to raise and support one end of the platform 2. The platform stud 13 is a fixed part of the platform so that when the latter is connected to the truck for transport, the truck 1 swivels about the stud as a vertical axis in steering the platform. The hardened bushing 82 prevents undue wear between the stud 13 and the socket 65 of the truck.

A locking latch 90 has a pair of apertured bosses 91 (Figures 7 and 8) and is mounted for swinging movement on the pivot shaft 57. The locking latch 90 includes an upper section 93, a counterweighted arm 94, a tripping lug 95 and a trip pawl releasing lug 96. The end 93 is formed with a recess 98 that is adapted to receive a lug 99 (Figure 8) formed on the forward portion of the platform engaging and raising socket member 65. The lug 99 forms a part of a vertical fin or flange 100 formed on the member 65 and having a forwardly disposed arcuate surface which is adapted to cooperate with the nose portion 101 of the locking latch, as will be explained below. The socket member 65 is provided with a pair of lugs 102 (Figure 8), one on each side of the flange 100, which are adapted to engage the lugs 25 on the frame to limit the relative movement between the frame 20 and socket member 65 in one direction, as will be referred to below. Also, the latch 93 is provided with a lug 105 that cooperates with a stop 106 carried on the strap member 40, as best indicated in Figures 1, 4 and 7.

A reset finger in the form of a pawl 110 is pivoted for rocking movement on the shaft 28 at one side of the frame 20 inside the side 20b. The reset pawl is formed with a shoulder 111 and an arm 112, the latter being curved laterally inwardly to a point adjacent the central longitudinal axis of the truck to a position where it is adapted to be engaged by the lug 99 on the socket member 65. The shoulder 111 on the reset pawl 110 cooperates with a lug 113 formed on the locking latch 90 on the side thereof opposite the lug 105, as will be explained below. The reset finger is adapted to be raised by a pin 114 on the strap 40 of the handle 38, as best shown in Figure 6.

A trip pawl 120 is loosely mounted on the handle 38, preferably between the strap members 40 and 41. To this end, the strap members 40 and 41 carry a transverse pin 121 which is received within the arcuately slotted section 122 of the trip pawl 120. The latter is provided with a downwardly extending arm 123, the lower end of which is formed with a notch 124 (Figures 5 and 7) adapted to engage the outer end of the arm 95, as will be described below. Lugs 126 and 127 extend toward the handle and are spaced apart a considerable distance by the section 128 of the trip pawl 120. The lugs 126 and 127 are arranged to overlie the lower end of the handle socket 39 and cooperate with the pin 121 to limit the relatively free movement between the trip pawl 120 and the handle 38.

The operation of the truck described above is substantially as follows:

The truck 1 with all of the parts arranged as indicated in Figure 4 is brought up to the platform 2, which is supported at one end on the wheels 5 and at the other end on the legs 8, and is wheeled by the operator into a position (Figure 4) with the upper section 21 of the frame and the socket member 65 under the truck receiving stud 13 in the bracket 10. When the handle 38 is swung downwardly, the arms 23a and 23b on the truck frame casting will serve as a slot to guide the socket member in a position to receive the stud 13 on the platform. The handle 38 engages the lower truck frame extension 22 and by pushing downwardly the operator rocks the entire truck about the axis of the axle 28. This causes the socket member 65 to move upwardly into full engagement with the stud 13, and as soon as this full engagement is secured, the socket member 65 is kept in alignment with the pin or stud 13 by the close fit between the two parts.

Continued downward movement of the handle 38 acts through the truck frame 20 to exert an upward thrust against the stud 13 on the platform 2 through the socket member 65, thereby raising the front end of the platform off the floor, the weight then being supported on the truck. This downward movement of the handle and the upward thrust against the forward end of the truck continue until the locking latch 90 swings in a counterclockwise direction (Figures 4 and 5) under the action of the counterweight 94 to swing the notch 98 underneath the nose 99 of the socket member. This action locks the socket member 65 against movement in either direction since the engagement of the lugs 25 and the locking latch 90 with the socket member prevents the frame 20 from moving relative to the socket member. That is, the socket member 65 can rotate in a horizontal plane about the stud 13 to provide for steering, but the locking latch 90 prevents the truck from rocking in a counterclockwise direction (Figure 5) relative to socket member 65, and the engagement of the lugs 25 on the truck frame with the socket member 65 prevents relative clockwise movement. The locking movement of the latch 90 just described carries the lug 105 out of engagement with the lug 106 on the handle, as shown in Figure 5, so that the handle is now free to be raised about the axis of the axle 28. When the operator releases hold of the handle the spring 60 serves to raise it automatically to a nearly vertical position where it will be out of the way. The truck and platform may be towed or pushed as a unit in the same manner as any four wheeled truck, and the handle may be raised or lowered within a comfortable range for manipulation, as indicated in Figures 5 and 6.

To lower the platform and release the truck from the platform the operator pushes down on the handle until the notch 124 on the arm 123 of the trip pawl 120 engages the lug 95 on the locking latch 90. The handle is then pushed down farther until the pin 121 engages the lower end of the slot 122 in the trip pawl 120, as illustrated in dotted lines in Figure 7. After the pin 121 engages the lower end of the slot, a slight additional downward movement of the handle will force the trip pawl 120 to rock the locking latch 90 in a clockwise direction (Figure 7) about the pivot 57 and will swing the arm 93 of the locking latch 90 out of engagement with the socket member 65. This occurs when the handle is almost in contact with the extension 24 of the truck frame 20. However, the releasing or clockwise movement of the locking latch 90 carries the lug 96 on the latter into engagement with the trip pawl 120, swinging the latter in a counterclockwise direction about its pivot 121, so that the arm 123 of the trip pawl 120 is automatically disengaged from the lug 95 on the locking latch 90. The clockwise movement of the locking latch 90 also moves the lug 113 on the latter outwardly of the reset pawl 110 until the shoulder 111 on the latter drops behind the lug 113 on the locking latch 90, thereby holding the locking latch 90 disengaged from the socket member 65, as shown in Figure 8.

The weight of the platform is now sustained by the handle 38 so that as the operator permits the latter to rise, the platform is gradually lowered until the legs 8 rest on the floor, the socket member 65 pivoting about the pins 68 and 69 under the combined action of the springs 74 and 75 and the engagement between the member 65 and the platform stud 13. As the handle continues to be raised and the platform lowered, the clockwise rotation of the socket member 65 relative to the truck frame 20 causes the nose 99 on the member 65 to engage the arm 112 on the reset pawl 110 when the member 65 swings into a position adjacent the upper end of the arm 93 on the locking latch 90. As this motion continues, the nose 99 acts against the arm 112 to force the pawl 110 upwardly, swinging the shoulder 111 away from the lug 113 and permitting the end of the arm 93 of the locking latch 90 to drop against the flange 100 on the socket member 65. This returns the jack to its original position (Figure 4) in which it is again ready to engage and raise a platform.

The jack may be supported in inoperative position by raising the handle to the position shown in Figure 6 and resting the portion 21 of the truck frame 20 on the floor, as shown in Figure 3.

Referring now to Figure 9, in this form of the invention the platform 2 carries a bracket 10a which consists of a casting 140 (Figure 10) having a socket section 141 and wings 142 and 143 to which bars 144 and 145 are welded, the bars 144 and 145 extending underneath the platform 2 and securely attached thereto in any suitable manner. The lower portion of the casting 140 surrounding the bore 148 therein is formed with lugs and recesses 151 and 152. The socket member 65 of the truck carries a hardened bushing 82a which receives the lower end 154 of a stud or pin 155. The lower end of the stud 155 carries a washer 156 that is held in place by a cotter pin 157 or the like. By virtue of this construction, the stud or pin 155 is attached to and forms a part of the truck 1, instead of being permanently fixed to the platform as shown in Figures 1 and 4. In Figure 9 the stud or pin 155 turns freely within the bushing 82a relative to the truck but the pin is at all times carried by the latter. The upper section 159 of the pin 155 is tapered, as at 160, to facilitate the insertion of the upper section 159 into the socket 148 of the platform bracket 10a when it is desired to engage and raise the platform. The pin or stud 155 has a flange 161 in which upwardly facing teeth or lugs 162 are carried.

If desired, the platform-carried bracket, as indicated at 10b (Figure 11), may be formed of a single length of strap iron bent to form a loop 162. A short section of pipe 163 may be secured, as by welding, to the bracket 10b to receive the end 159 of the truck stud 155. The bracket 10b is provided with lugs 165 similar to the lugs 151 shown in Figure 10.

The operation of the form of the invention shown in Figures 9, 10 and 11 is substantially the same as that shown in Figures 1 to 8, except that when swinging the truck into position to engage and raise the platform, the truck stud 155 is inserted into the bore 148 of the socket 141, instead of engaging a socket on the truck with a stud on the platform as described in connection with Figures 1 to 8. When the pin 155 is in place, the teeth 162 on the flanged part thereof engage the corresponding lugs and recesses 151 and 152 on the platform bracket 10a, so as to lock the stud 155 against rotation relative to the platform, thus assuring that all rotation between the pivot stud and the truck socket will take place between the lower end 164 thereof and the hardened bushing 82a.

Another form of platform engaging and supporting socket member is indicated somewhat fragmentarily in Figure 12. In this form, the socket member 65a is somewhat larger than the form shown in Figure 1, and is provided with a hardened bushing 171 that receives the central downwardly extending shank 172 of a turntable 173, the latter having a relatively wide base indicated at 174. The shank 172 is hollow, as indicated at 175, and is adapted to receive a platform stud 13a similar to the pin or stud 13 shown in Figure 1. If desired, anti-friction thrust bearings may be provided between the base 174 of the turntable 173 and the upper end of the socket member 65a. In operation, the truck is manipulated to engage the turntable sleeve or socket 175 with the platform stud 13a so as to engage and support the front end of the platform. The platform stud or pin 13a and the turntable may have cooperating means, such as lugs and recesses like those described above for insuring that the turntable, although carried by the truck, will turn with the platform.

While I have shown and described the preferred means in which the principles of my invention have been embodied, it is to be understood that my invention is not to be limited to the specific details shown and described above, but that, in fact, widely different means may be used in the practice of the broader aspects of my invention.

What I claim, therefore, and desire to secure by Letters Patent is:

1. A truck for raising and supporting one end of a lifting platform having a truck receiving section, comprising a wheel supported frame, a handle pivoted to the frame for movement relative thereto, releasable latch means movable into two positions and adapted in one position to lock the handle to the frame to prevent relative rotation therebetween, whereby the handle is adapted to swing the frame into and out of platform engaging and supporting position, a part pivotally mounted on said frame and having means to engage and support said platform section, said releasable latch means being adapted to be moved into its other position to lock said part to said frame after the platform is engaged and supported thereon, and means actuated by the handle for moving said releasable latch means from said one position to the other position.

2. A truck for raising and supporting one end of a lifting platform having a truck receiving section, comprising a wheel supported frame, a handle pivoted to the frame for relative movement thereto and adapted to swing the same into and out of platform engaging and supporting position, a part pivotally mounted on said frame for movement about an axis parallel to the axis of said wheels but spaced therefrom, said part having means to engage and support said platform section, latch means for releasably locking said part to said frame after the platform is engaged and supported thereon, and means on the handle and operated by movement of the latter relative to the frame to disengage said latch for releasing said part and permitting said platform to be lowered.

3. A truck for raising and supporting one end of a lifting platform having a truck receiving section, comprising a wheel supported frame, a handle pivoted to the frame for relative movement thereto and adapted to swing the same into and out of platform engaging and supporting position, a part pivotally mounted on said frame for movement about an axis parallel to the axis of said wheels but spaced therefrom, said part having means to engage and support said platform section, latch means for releasably locking said part to said frame after the platform is engaged and supported thereon, a trip latch movably mounted on said handle and operated thereby when the handle is moved relative to said frame for disengaging said locking latch from said part, and means for disengaging said trip latch from said locking latch when the latter has been released.

4. A truck for raising and supporting one end of a lifting platform having a truck receiving section, comprising a wheel supported frame, a handle pivoted to the frame for relative movement thereto and adapted to swing the same into and out of platform engaging and supporting position, a part pivotally mounted on said frame for movement about an axis parallel to the axis of said wheels but spaced therefrom, said part having means to engage and support said platform section, a locking latch pivotally mounted on said frame and biased for movement toward said part, a trip latch carried by the handle and adapted when the latter is moved relative to the frame for moving said locking latch away from said part, means on the locking latch for disengaging the trip latch therefrom when the locking latch is released from said part, and means for holding said locking latch disengaged from said part until the latter has moved to a position permitting disengagement of the truck from the platform.

5. A wheeled truck adapted to engage and raise a platform having a depending stud, said truck comprising a wheeled frame, a handle for manipulating the same, a sleeve pivoted on the truck and adapted to receive said stud, and a slot formed in the frame and generally embracing said sleeve so as to guide said stud into a position to enter said sleeve when the frame is swung to raise the platform, said slot having its front end open at the forward upper portion of said frame.

6. A truck adapted to engage and raise a platform, the latter having a truck-receiving part, said truck comprising a pair of wheels, a frame mounted thereon for swinging movement about the axis of said wheels and provided with a generally U-shaped upper section normally horizontal when a platform is supported at one end on said truck, a lifting element pivotally supported in the upper portion of said frame between the sides of said U-shaped section, and a handle operatively connected with said frame for swinging the latter to carry said element into engagement with said platform part and to raise said platform, the open portion of said U-shaped upper frame section facing forwardly to receive said platform part and guide the latter toward the lifting element during the downward swinging movement of said frame in the lifting direction, the rearward closed portion of said U-shaped upper section being disposed in substantially the same horizontal plane with the forward open portion thereof when the truck is supporting a platform.

7. A truck comprising a pair of supporting wheels, an axle therefor, a frame swingably supported on said axle, means for swinging said frame, a platform engaging member pivotally supported on said frame in a position to engage and raise a platform when the same is swung on said axle in one direction, latch means coacting with said frame and said platform engaging member and spring means operative when said member is released from said platform for holding the member against movement relative to the frame and in a position to facilitate engaging said member with the platform, and also operative to exert pressure on said latch means.

8. A truck comprising a pair of wheels, a truck frame pivotally supported thereon, a handle pivoted to said frame for swinging movement, a platform raising member also pivoted to said frame and adapted, when engaged with the platform, to move therewith about its axis relative to said truck frame, and latch means carried by said frame and operative in one position to lock said handle against movement relative to the frame, said latch means being releasable through manipulation of said handle.

9. A truck for engaging and raising a platform or the like, comprising a frame, wheels supporting said frame, a handle pivoted thereto, a platform engaging member pivoted to said frame, said handle being adapted to engage a portion of the frame for swinging the latter to carry said platform engaging member into engagement with and to raise said platform, latch means carried by said frame for locking said frame against movement relative to said platform engaging member when the platform is raised, and means comprising a part engaging with said latch means to lock the handle against movement relative to said frame when said latch means releases said platform engaging member during the lowering of said platform.

10. A truck comprising a pair of wheels, a truck frame pivotally supported thereon, a handle pivoted to said frame for swinging movement, a platform raising member also pivoted to said frame and adapted, when engaged with the platform, to move therewith about its axis relative to said truck frame, a releasable locking latch movable into a position to lock the frame against movement relative to said platform engaging member when the platform has been engaged and raised by downward swinging movement of the frame by said handle, and means carried by said locking latch and engageable with said handle for locking the same against movement relative to the frame during the lowering of the platform.

11. A truck comprising a pair of wheels, a truck frame pivotally supported thereon, a handle pivoted to said frame for swinging movement, a platform raising member also pivoted to said frame and adapted, when engaged with the platform, to move therewith about its axis relative to said truck frame, a locking latch pivoted to said frame and movable into a position to lock the frame against movement relative to said platform engaging member when the platform has been engaged and raised by downward swinging movement of the frame by said handle, means for releasing said locking latch to permit said platform to be lowered, means carried by said locking latch and engageable with said handle for locking the same against movement relative to the frame during the lowering of the platform, and means actuated by the movement of said platform engaging member relative to said frame during the lowering of the platform for releasing said locking latch from its engagement with said handle.

12. A truck comprising a wheel supported frame, a handle connected therewith for swinging said frame for raising and lowering a platform, a platform engaging and supporting member pivoted on said frame and movable with the platform relative to said frame during raising and lowering of the platform, and latch means movable into either of two positions and including a first part operative in one position of the latch means to engage said platform engaging member and lock the same against movement relative to said frame and a second part operative in the other position of said latch means to engage said handle and lock the latter against movement relative to said frame.

13. A truck comprising a wheel supported frame, an eccentrically positioned platform engaging member pivoted to said frame, handle means for swinging said frame to raise said platform engaging member into engagement with and to raise said platform, latch means operative when said platform has been raised for holding said member against movement about said axis relative to said frame, means for disengaging said latch means from said platform engaging member, and means carried by said frame for holding said latch means in disengaged position until the lowering of the platform has been completed, said latch means being separate from said platform engaging member.

14. The combination of a platform having a truck receiving part, a truck comprising a frame, wheels supporting said frame, a platform engaging member pivoted to said frame and adapted to engage said truck receiving part on the platform and to be secured thereby against movement relative to said platform, whereby swinging movement of said frame about the axis of said wheels serves to raise or lower said platform, releasable means for locking said frame against movement relative to said platform engaging member, to hold said platform in elevated position, handle means for swinging said frame, means carried by said handle means for releasing said releasable means to provide for lowering said platform, mechanism for holding said releasable means in released position during the lowering of the platform, and means carried by said platform engaging member for moving said mechanism into a position releasing said releasable means at the end of the lowering movement of said platform.

15. In combination, a platform having a bracket secured thereto and stud receiving means on said bracket, and a wheel supported truck having an eccentrically mounted platform engaging member rotatably carrying a stud having an upwardly extending part and means thereon to engage the platform bracket to prevent rotation of said stud relative to said platform when said truck engages and raises the platform.

16. In combination, a load supporting platform having a bracket secured thereto with a socket formed thereon at one end of the platform, a truck comprising a frame, wheels supporting said frame, and a platform engaging member pivoted on the frame in eccentric relation with respect to the axis of the supporting wheels, said member having a socket formed therein, a stud having a flange intermediate its end, one end of said stud being adapted for insertion into the socket in said platform bracket and the other end being adapted for insertion into the socket of said platform engaging member, means for securing said stud in said last named member for rotation with respect thereto, and lugs and recesses formed on said flange and said platform bracket serving to prevent said stud from rotating relative to said bracket after said truck has been swung to move said stud into the socket in said platform bracket.

17. A truck comprising a pair of wheels, a truck frame pivotally supported thereon, a handle pivoted to said frame for swinging movement, a platform raising member also pivoted to said frame and adapted, when engaged with the platform, to move therewith about its axis relative to said truck frame, a part on said frame engageable by said handle when the latter is swung downwardly whereby said frame and handle swing together when raising said member and the platform engaged therewith, latch means carried by said frame and adapted in one position to lock the frame against movement relative to said platform engaging member, and a member carried by said handle and operative when the latter approaches a position engaging said part on the frame to engage said latch means and release the latter from engagement with said platform raising member whereby the reaction of the weight of the platform is transferred to said handle through said part on the frame which is engaged by the handle.

18. A truck as defined in claim 17 further characterized by the provision of means for holding said latch means in its released position and out of engagement with said platform engaging member until the latter has been moved into one position by the lowering of the platform.

19. A truck adapted to engage and raise a platform, the latter having a truck receiving part, said truck comprising wheel means, a frame mounted thereon for swinging movement about the axis of said wheel means, handle means pivoted to said frame, a platform engaging member pivoted to said frame and adapted to engage and raise a platform when said handle and frame are swung downwardly, a latch engageable with said platform receiving part for releasably locking the latter against movement relative to the frame when the platform is raised, a part carried by said handle and engageable with said latch when the handle is moved to one position relative to the frame for disengaging the latch from said platform engaging member to provide for lowering the platform, and means for disengaging said part from the latch when the latter moves into its released position.

20. A truck for engaging and raising a platform or the like, comprising supporting wheel means, a frame mounted thereon for swinging movement, a handle pivoted to said frame and engageable with a part thereof in a lower position of the handle, whereby the latter is enabled to swing said frame in a position to engage and raise a load, a platform engaging member pivotally carried on said frame, a latch also pivoted on said frame and engageable with said platform engaging member for preventing movement thereof relative to said frame so as to hold the latter against movement relative to the platform engaging member when the latter is engaged with and supporting a platform, a trip pawl carried by said handle and engageable with said latch when the handle is moved downwardly to engage said frame, said trip pawl serving to release said latch from engagement with said platform engaging member adjacent the point where the handle engages said frame, and a part on said latch engageable with said trip pawl for moving the latter into its released position whereby said latch is free to reengage the platform engaging member when the latter subsequently engages and raises a platform.

21. A truck adapted to engage and raise a platform, the latter having a truck receiving part, said truck comprising a frame, wheel means therefor, a lifting element pivotally supported on said frame in a position to receive and support said truck receiving part, handle means pivotally connected to said frame and engageable with a part thereof when swung in one direction for swinging said frame and said lifting element into engagement with the platform, a latch pivoted to said frame below said handle and including an upwardly extending section adapted in one position to engage said lifting element to lock said frame and lifting element against relative movement, said latch having a part disposed under said handle means, and a trip pawl carried by the handle and engageable with said part of the latch means for swinging the latter out of engagement with said lifting element.

22. A truck as defined in claim 21, further characterized by said latch means extending upwardly adjacent the handle means and carrying a lug adapted to move into engagement with said handle means when the latter actuates said trip pawl for moving the latch means out of engagement with the lifting element, said lug means acting to hold said handle means against movement relative to the frame.

23. A truck comprising a pair of wheels, a truck frame pivotally supported thereon, a handle pivoted to said frame for swinging movement, a platform raising member also pivoted to said frame and adapted, when engaged with the platform, to move therewith about its axis relative to said truck frame, latch means carried by said frame and operative in one position to lock said frame and platform engaging member against movement relative to each other, and cooperating means on the latch means and handle for locking the latter against movement in the other position of said latch means.

24. In a device of the class described, a pair of wheels and a shaft supported thereby, a main frame freely rotatable about the axis of said shaft, a lifting trunnion pivoted on said frame and adapted to be lifted and lowered as said frame rotates on said axis, a lifting lever for rotating said frame, a spring pressing said lifting lever upwardly and in a non-lifting direction relatively to said frame, and means between said frame and lifting lever for locking said lifting lever against said movement by said spring beyond a predetermined position.

25. In a device of the class described, a pair of wheels and a shaft supported thereby, a main frame freely rotatable about the axis of said shaft, a lifting trunnion pivoted on said frame and adapted to be lifted and lowered as said frame rotates on said axis, a lifting lever for rotating said frame, a spring pressing said lifting lever upwardly and in a non-lifting direction relatively to said frame, latch means for establishing a latched relation between said lifting trunnion and said main frame, and means responsive to downward movement of said lifting lever to a predetermined position in opposition to said spring for releasing said latch means.

26. In a device of the class described, a pair of wheels and a shaft supported thereby, a main frame freely rotatable about the axis of said shaft, a lifting trunnion pivoted on said frame and adapted to be lifted and lowered as said frame rotates on said axis, a lifting lever for rotating said frame, a spring pressing said lifting lever upwardly and in a non-lifting direction relatively to said frame, locking means for establishing a locked relation between said lifting trunnion and said main frame, means responsive to downward movement of said lifting lever to a predetermined position in opposition to said spring for releasing said locking means, and means for holding said locking means released during the lowering of the load.

27. In a device of the class described, a pair of wheels and a shaft supported thereby, a main frame freely rotatable about the axis of said shaft, a lifting trunnion pivoted on said frame and adapted to be lifted and lowered as said frame rotates on said axis, a lifting lever for rotating said frame, locking means for establishing a locked relation between said lifting trunnion and said main frame when the load is elevated, means responsive to downward movement of said lifting lever for releasing said locking means, pawl means for holding said locking means in released position during the lowering of the load, and means for releasing said pawl means substantially when the load has been lowered.

28. In a device of the class described, a pair of wheels and a shaft supported thereby, a main frame freely rotatable about the axis of said shaft, a lifting trunnion pivoted on said frame and adapted to be lifted and lowered as said frame rotates on said axis, a lifting lever pivotally mounted on said main frame for vertical swinging movement relatively thereto, latch means for establishing latched relation between said lifting trunnion and said main frame, and means responsive to downward pivotal movement of said lifting lever relatively to said main frame for releasing said latch means.

29. In a device of the class described, a pair of wheels and a shaft supported thereby, a main frame freely rotatable about the axis of said shaft, a lifting trunnion pivoted on said frame and adapted to be lifted and lowered as said frame rotates on said axis, a lifting lever for rotating said frame to raise the load, latch means for latching said lifting trunnion and said main frame together, and means responsive to movement of said lifting lever for releasing said latch means.

STEPHEN O. HARLAN.